April 13, 1948.  G. O. LEGGETT ET AL  2,439,476
INDICATOR
Filed Feb. 11, 1946  2 Sheets-Sheet 1

Inventors:
Guy O. Leggett
and Earl Nathan.
By James K. Michell
Atty.

April 13, 1948.  G. O. LEGGETT ET AL  2,439,476
INDICATOR
Filed Feb. 11, 1946  2 Sheets-Sheet 2

Inventors:
Guy O. Leggett
and Earl Nathan.
By James K. McNeill
Atty.

Patented Apr. 13, 1948

2,439,476

UNITED STATES PATENT OFFICE 2,439,476

INDICATOR

Guy O. Leggett and Carl Nathan, Chicago, Ill.

Application February 11, 1946, Serial No. 646,824

5 Claims. (Cl. 116—31)

This invention relates to indicators, and particularly to a device for use in automotive vehicles as a steering aid to indicate the position of the steerable wheels. The device is especially useful in maneuvering in and out of parking spaces, and is likewise valuable in the training of novice drivers by indicating at all times the position of the steerable wheels of the vehicle, which are normally invisible from the operator's seat.

Therefore, an object of the invention is to provide, for attachment to an automobile or the like wherein the steerable wheels are normally invisible to the vehicle operator, a device in the view of the operator to indicate the position of the wheels.

Another object is to provide a position indicator for the wheels of an automotive vehicle in the form of a miniature representation of an automobile or the like having steerable wheels mounted for swinging movement to right and left in the manner of a full sized vehicle.

Another object is to provide a position indicator for the wheels of an automotive vehicle, wherein the indicator is operatively connected to the vehicle steering mechanism in such a manner as to transmit to the indicator the movement imparted to the dirigible wheels at all times throughout the range of movement of the steering mechanism.

A further object is to provide as an attachment for an automobile or the like, a position indicator for the dirigible wheels thereof, wherein the indicator mechanism is operatively connected with the automobile steering apparatus to be actuated by the movement thereof, and wherein means are provided for varying the extent of movement of the indicator to conform to different steering apparatus with which the indicator may be associated.

Figure 1:
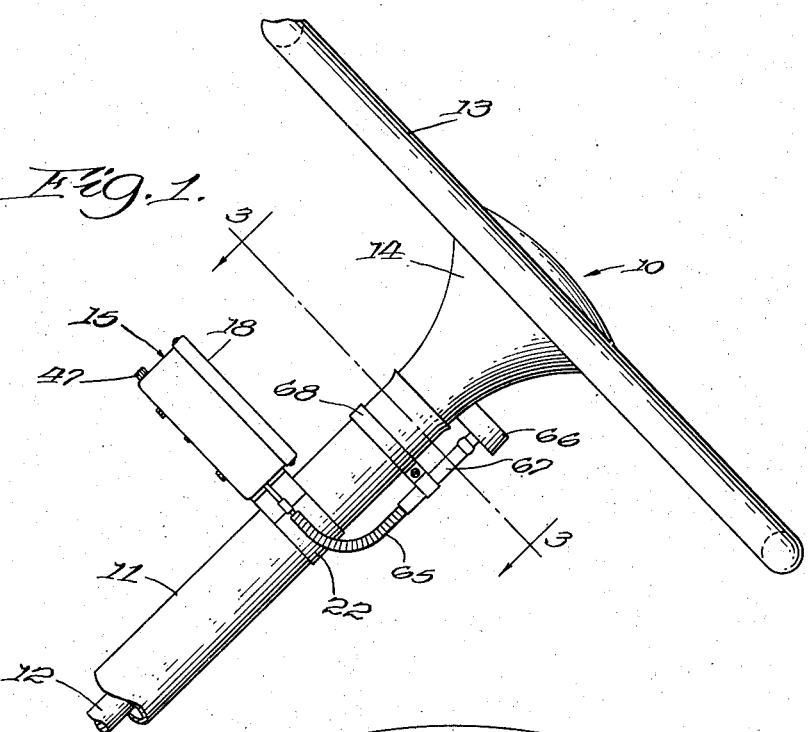
Figure 2:
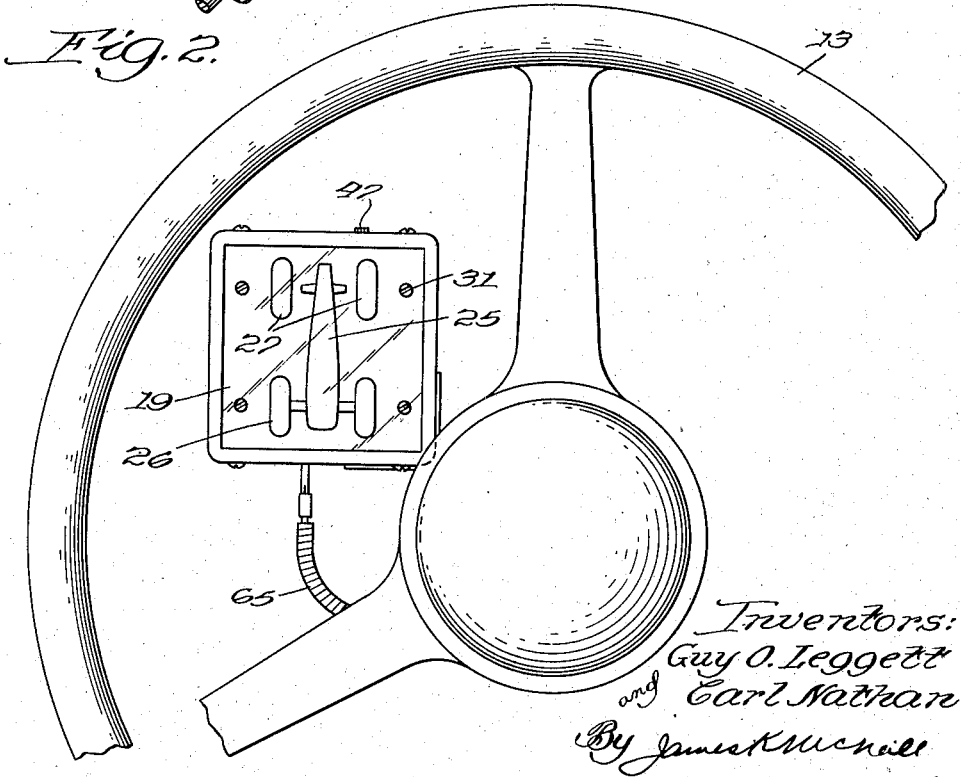
Figure 3:
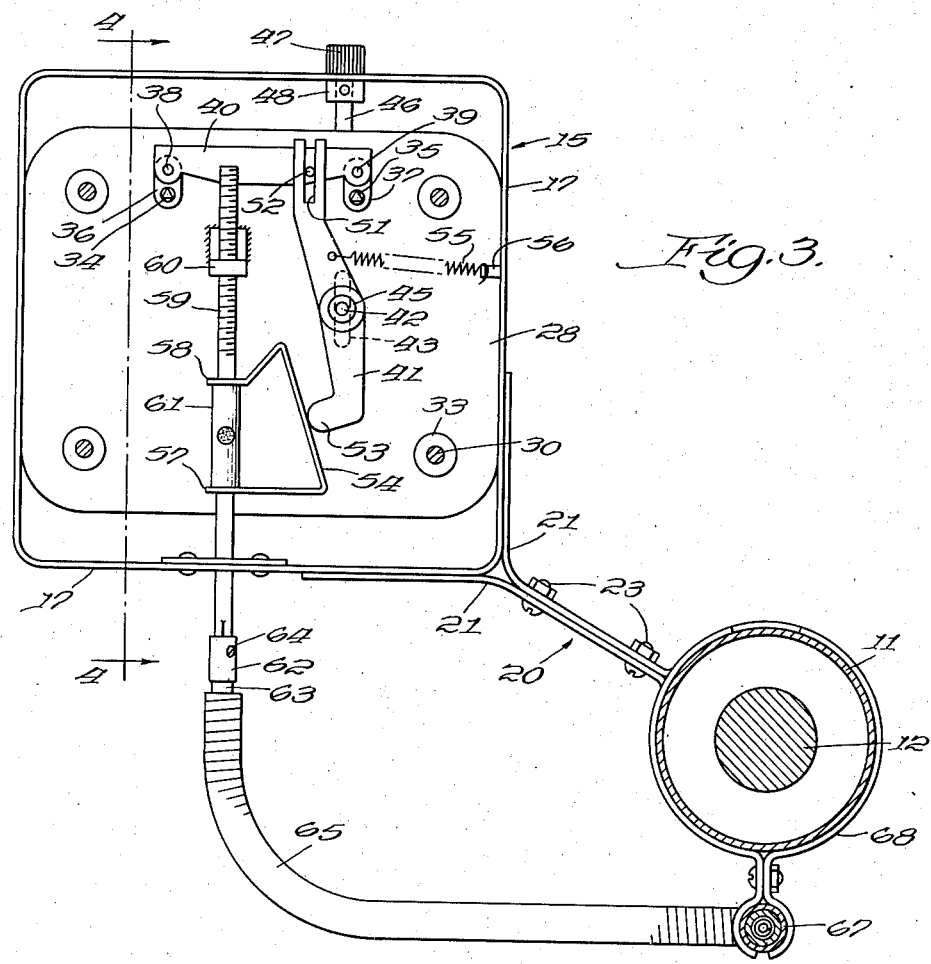
Figure 4:
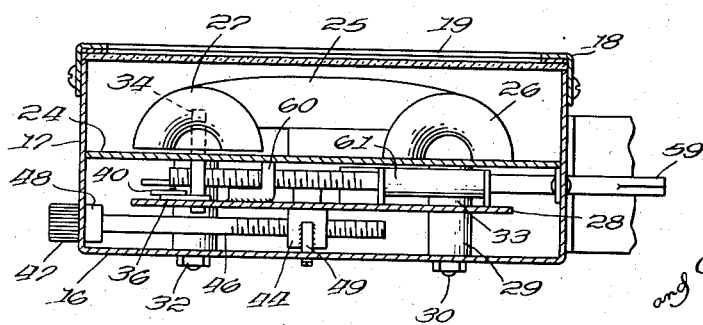
Figure 5:
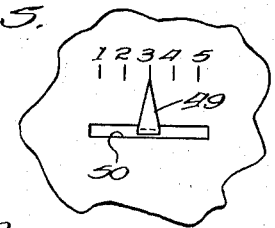

Other objects and advantages of the invention will become clear from the following detailed description when read in conjunction with the accompanying drawings, wherein Figure 1 is a view in side elevation of an automobile steering wheel and column showing the indicator of the present invention connected thereto in a position easily visible to the driver, Figure 2 is a view from the driver's seat of the structure shown in Figure 1, Figure 3 is a view, partly in section, taken on the line 3—3 of Figure 1, with the indicator face removed and showing the mechanism for controlling the operation of the indicator of the present invention, Figure 4 is a section taken on the line 4—4 of Figure 3, and Figure 5 is a detail of the pointer structure utilized in adjusting the operating mechanism to the proper ratio between steering mechanism and indicator.

Referring to the drawings, the indicator of the present invention is illustrated as installed in an automobile having a conventional steering mechanism generally indicated by the numeral 10. The steering mechanism includes a fixed steering column, or post 11. This steering column provides a housing for a shaft 12 which is rotatable therein and has secured to its upper end a steering wheel 13. The shaft 12 is connected to the vehicle's dirigible wheels, not shown, by any suitable known mechanism whereby steering motion may be transmitted from the wheel 13 to the vehicle wheels. Steering wheel 13 is provided with a flared hub portion 14 which rotates therewith and has a portion of smaller diameter which terminates adjacent the upper end of the column 11.

As pointed out hereinbefore, it is of considerable importance to a driver to be able to determine the position occupied by the steerable wheels of the vehicle, which are normally out of his range of vision from his position behind the steering wheel. Therefore, the present invention is designed to provide indicator means easily visible to the driver which will enable him at all times to determine the position of the wheels. This indicator means comprises a box-like housing 15 of suitable material such as metal having a base 16, integral side walls 17 and a removable cover 18 provided with a transparent portion 19. Housing 15 is removably secured to the steering column 11 by means of a bracket 20 comprising a pair of straps 21 affixed to the side walls 17 of the housing and projecting therefrom and terminating in a clamp 22. The straps 21 are fastened together by bolts 23.

Removably fitted within the box 15 and parallel to the base thereof is a panel or face 24 having mounted upon its upper surface a miniature representation of an automobile, preferably of wood, plastic or the like, and comprising a body 25 arranged to extend longitudinally in the direction of travel of the vehicle, rear wheels 26 and swingable front wheels 27 which are capable of being steered. The body 25 and rear wheels 26 are affixed to the face 24 by any suitable means, such as glue, while the front wheels 27 are mounted for swinging movement about vertical axes, in a manner hereinafter set forth, in simulation of the movement of the actual vehicle wheels. As indicated in Figure 4, the wheels 26 and 27 are in the form of semi-circular segments and are illustrated in their normal neutral position. In the drawings this position is illustrated as one in which the wheels are parallel to a line extending longitudinally through the vehicle.

The operation of the dirigible front wheels 27 is controlled by mechanism mounted in the box 15, now to be described. Between panel 24 and the base 16 of the box there is provided a plate 28, which is maintained in spaced relation to the base 16 by a number of spacer sleeves 29 having received therein bolts 30 which pass through the panel 24 and the base 16 and are provided with heads 31 and nuts 32 on the threaded lower ends thereof, by which the parts are held against displacement. Additional sleeves 33 space the plate 28 from the panel 24.

Plate 28 has rotatably seated therein the lower ends of a pair of laterally spaced vertically extending spindles 34 and 35 with their upper portions triangular in cross-section, having secured thereto and resting upon the upper surface of plate 28 a pair of longitudinally extending links 36 and 37. The other ends of the links 36 and 37 are pivotally connected at 38 and 39 for movement about vertical axes to the ends of a transversely extending cross-piece 40. The upper ends of the triangular spindles 34 and 35 project upwardly through the indicator panel 24, as shown in Figure 4, and are received in triangular openings provided in the left and right hand front wheel segments 27, so that rotation of the spindles causes corresponding rotation of the front wheel segments.

Turning of the spindles 34 and 35 and therefore the dirigible wheels 27 mounted thereon in a manner to simulate the movement of the actual vehicle wheels is accomplished by moving the cross-piece 40 transversely to left and right to swing the links 36 and 37 and thus turn the spindles. The mechanism for controlling the movement of cross-piece 40 includes a lever 41 pivotally mounted medially of its ends upon a vertical pin 42, projecting through a slot 43 in plate 28 and seated in a block 44. The lever 41 is held against displacement from the pin 42 by a collar 45. Lever 41 is capable of movement within the limits of the slot 43 to change the location of its pivot for a purpose that will hereinafter become clear, and the lever is adjusted and held in its adjusted position by means of an elongated threaded bolt 46 extending through one side wall 17 of the box and having a head 47 thereon engaging the outside of the wall 17. The bolt is provided with a collar 48 engaging the inner side of the wall to prevent displacement of the bolt from the box. The threaded end of the bolt 46 is received in a threaded opening in block 44 to hold the block and therefore the lever 41 in position. Longitudinal movement of the lever within the limits permitted by the slot 43 is accomplished by turning the bolt to move the block 44. The desired position of the lever pivot is selected by observing the position of a pointer 49 which is secured, as by welding, to one side of block 44. Pointer 49 extends downwardly through a slot 50 in base 16 and is bent at right angles and sharpened. The lower surface of the base 16 is marked as indicated in Figure 5 to provide a graduated dial over which pointer 49 may move as the block 44, and therefore the pivot of lever 41, moves within the limits of the slot 43. The purpose of this adjustment will be more fully explained hereafter.

One end of lever 41 has a longitudinally extending open ended slot 51 therein to receive for relative sliding movement a pin 52 projecting upwardly from cross-piece 40. The other end of the lever has a laterally projecting head portion 53 arranged to engage the inclined surface of a generally U-shaped abutment member 54, and resiliently biased to engaged position by a spring 55 connected at one end to the lever and anchored at its other end to a bracket 56 secured to plate 28. Member 54 has arms 57 and 58 apertured to receive an elongated rod or reciprocable member 59 having one end threaded for reception in a threaded opening in a bracket 60 affixed, as by welding, to the plate 28. The arms 57 and 58 of member 54 are spaced by a collar 61 secured to the rod 59. The other end of the rod projects through one of the walls 17 of the indicator housing and is received in a socket 62 carried at the end of a flexible cable 63 and held in place by a set screw 64. Cable 63 is rotatable in a flexible sheath 65, and to its other end is secured a roller 66, preferably of rubber, fiber or the like, which is arranged to frictionally engage the hub 14 of steering wheel 13. A sleeve 67 surrounds a portion of sheath 65 and provides means for anchoring thereto a clamp 68 by which the cable and sheath may be fastened to the steering column 11.

It should now be clear that a novel, useful and inexpensive device has been provided by the present invention which may be easily installed in an automotive vehicle, and by which the vehicle operator may determine at any stage in the operation of the vehicle the position occupied by the steerable wheels. In operation of the vehicle any rotary movement imparted to the steering wheel 13 is imparted directly to the roller 66 and transmitted by flexible cable 63 to threaded rod 59. The driving of rod 59 through the flexible cable and shaft causes the rod to move forwardly or rearwardly with respect to the bracket 60, carrying member 54 with it, and as member 54 moves, the head 53 of lever 41 moves over the inclined surface thereof and the lever swings about its pivot. For example, if steering wheel 13 is turned to the right, as viewed in Figure 2, roller 66 is rotated to the left, the motion being transmitted through cable 63 and rod 59 to move the rod and member 54 rearwardly. Due to the action of spring 55 the lever 41 pivots in a clockwise direction, as viewed in Figure 3, and by virtue of its connection with pin 52, moves cross-piece 40 to the right. The consequent swinging of links 36 and 37 causes rotation of shafts 34 and 35 and therefore the wheel segments 27 mounted thereon to the right to an extent corresponding to the turning of the vehicle wheels.

Of course, if an indicator having the same size friction roller for engaging the steering wheel hub as shown in the drawing is installed in an automobile having a wheel hub of different diameter, motion will be transmitted at a different rate from the steering wheel to the miniature pointer wheels of the indicator. The ratio is adjusted by the simple expedient of first disengaging roller 66 from contact with the hub 14 and turning the roller by hand until the steerable wheels 27 of the miniature car are lined up in the same vertical planes as the rear wheels thereof, whereupon the bolt 46 is turned to move the pivot pin 42 in the slot 43 and lengthen or shorten the distance between the lever pivot and the pin 52 on cross-piece 40. This changes the stroke of lever 41 and cross-piece 40 and causes wheel segments 27 to swing in synchronism with the actual vehicle wheels to left or right of a normal neutral position. The movement of pointer 49 over the dial shown in Figure 5 indicates to the operator the adjustment desired. For instance, were the hub 14 larger than that shown, the roller 66 would turn at a faster rate. It would then be necessary to shorten the distance between pins 42 and 52 to shorten the stroke of cross-piece 40 and compensate for the faster rotation of the roller 66, and bolt 46 would be turned until pointer 49 moves to the left on the dial. The same adjustment may, of course, be made when other factors than the size of the steering wheel hub are encountered. Likewise, the device may be actuated by other means than the friction roller described.

It is believed that the operation of the device of the present invention will be clear from the foregoing description. It should also be understood that various modifications may be made in the construction and arrangement of parts without departing from the spirit of the invention or the scope of the appended claims.

What is claimed is:

1. Mechanism for operating an indicator for the steerable wheels of an automotive vehicle comprising a support, a lever pivoted between its ends on the support, an abutment having an inclined face engageable with one end of the lever and movable to rock the latter about its pivot, a member connected to the other end of the lever and movable therewith, a pointer spindle rotatably carried by the support, means operatively connecting the member to said spindle whereby movement of the member rotates the spindle, and means responsive to operation of the steerable wheels of the vehicle for moving said abutment.

2. Mechanism for operating an indicator for the steerable wheels of an automotive vehicle comprising a support, a lever pivoted between its ends on the support, an abutment having an inclined face engageable with one end of the lever and movable to rock the latter about its pivot, a member connected to the other end of the lever and movable therewith, a pointer spindle rotatably carried by the support, means operatively connecting the member to said spindle whereby movement of the member rotates the spindle, means responsive to operation of the steerable wheels of the vehicle for moving said abutment comprising a threaded shaft, means securing the abutment to the shaft, means on the support to receive the threaded portion of said shaft, and means responsive to operation of the steerable wheels of the vehicle for rotating the shaft.

3. Mechanism for operating an indicator for the steerable wheels of an automotive vehicle having a steering wheel comprising a support, a lever pivoted between its ends on the support, an abutment having an inclined face engageable with one end of the lever and movable to rock the latter about its pivot, a member connected to the other end of the lever and movable therewith, a pointer spindle rotatably carried by the support, means operatively connecting the member to said spindle whereby movement of the member rotates the spindle, and means responsive to operation of the steerable wheels of the vehicle for moving said abutment, including a threaded rod, means securing the abutment to the rod, a bracket on the support threaded to receive the threaded portion of the rod, and means for rotating the rod comprising a flexible shaft, and a driving connection between the flexible shaft and the steering wheel.

4. Mechanism for operating an indicator for the steerable wheels of an automotive vehicle comprising a pointer, a rotatable shaft carrying the pointer, a member movable in a substantially straight line and operatively connected to said shaft for rotating the latter, a lever rockable about a pivot between its ends and having one end operatively connected to the member for effecting movement thereof, an inclined abutment member engaging the other end of the lever, resilient means biasing the lever to engagement with said abutment member, means for moving the abutment to swing the lever about its pivot, comprising a threaded rod carrying the abutment, a stationary threaded member arranged to receive said rod, and means for rotating said rod in response to the steering of the vehicle.

5. Apparatus for operating an indicator or the like comprising a support, an indicator shaft rotatably carried by the support, a lever pivoted on the support, linkage operatively connecting one end of the lever to said shaft for turning the latter in response to rocking of the lever, reciprocable means engageable with the other end of said lever for rocking the latter in opposite directions comprising a threaded shaft carried by the support for axial movement with respect thereto, an abutment member mounted on the shaft having an inclined face engageable with the other end of said lever for rocking the latter upon reciprocation of the abutment member, and means for driving the threaded shaft.

GUY O. LEGGETT.
CARL NATHAN.

REFERENCES CITED

The following references are of record in the file of this patent:

UNITED STATES PATENTS

| Number | Name | Date |
| --- | --- | --- |
| 1,181,218 | Fullerton | May 2, 1916 |
| 1,855,071 | Stefanson | Apr. 19, 1932 |
| 2,048,429 | Cole | July 21, 1936 |
| 2,119,567 | Williams | June 7, 1938 |
| 2,123,374 | McGauchie | July 12, 1938 |
| 2,175,637 | Pauli | Oct. 10, 1939 |